Aug. 2, 1960 H. A. HOLAPPA 2,947,824

APPARATUS FOR TESTING AUTOMATIC TELEPHONE EXCHANGE EQUIPMENT

Filed May 21, 1956 2 Sheets-Sheet 1

INVENTOR
H. A. HOLAPPA
BY C. B. Hamilton
ATTORNEY

APPARATUS FOR TESTING AUTOMATIC TELEPHONE EXCHANGE EQUIPMENT

Filed May 21, 1956 2 Sheets-Sheet 2

INVENTOR
H. A. HOLAPPA
BY C. B. Hamilton
ATTORNEY

United States Patent Office 2,947,824

Patented Aug. 2, 1960

2,947,824

APPARATUS FOR TESTING AUTOMATIC TELEPHONE EXCHANGE EQUIPMENT

Harvey A. Holappa, Elmwood Park, Ill., assignor to Western Electric Company, Incorporated, New York, N.Y., a corporation of New York Filed May 21, 1956, Ser. No. 586,132

4 Claims. (Cl. 179—175.2)

This invention relates to apparatus for testing automatic telephone exchange equipment, and more particularly to apparaus for testing centralized automatic message accounting dial pulse sender units.

An object of the invention is to provide new and improved apparatus for testing automatic telephone exchange equipment.

Another object of the invention is to provide new and improved apparatus for testing centralized automatic message accounting dial pulse sender units.

A further object of the invention is to provide new and improved test pulsing systems for exchange equipment.

An apparatus illustrating certain features of the invention may include a circuit for sending groups of pulses to a telephone exchange unit, the number of pulses in each group being selectable by a manually operable key set. A relay circuit operable by the key set sends pulses in groups of the selected number, and, if the unit responds correctly to the test, resets the key set.

Figure 1:
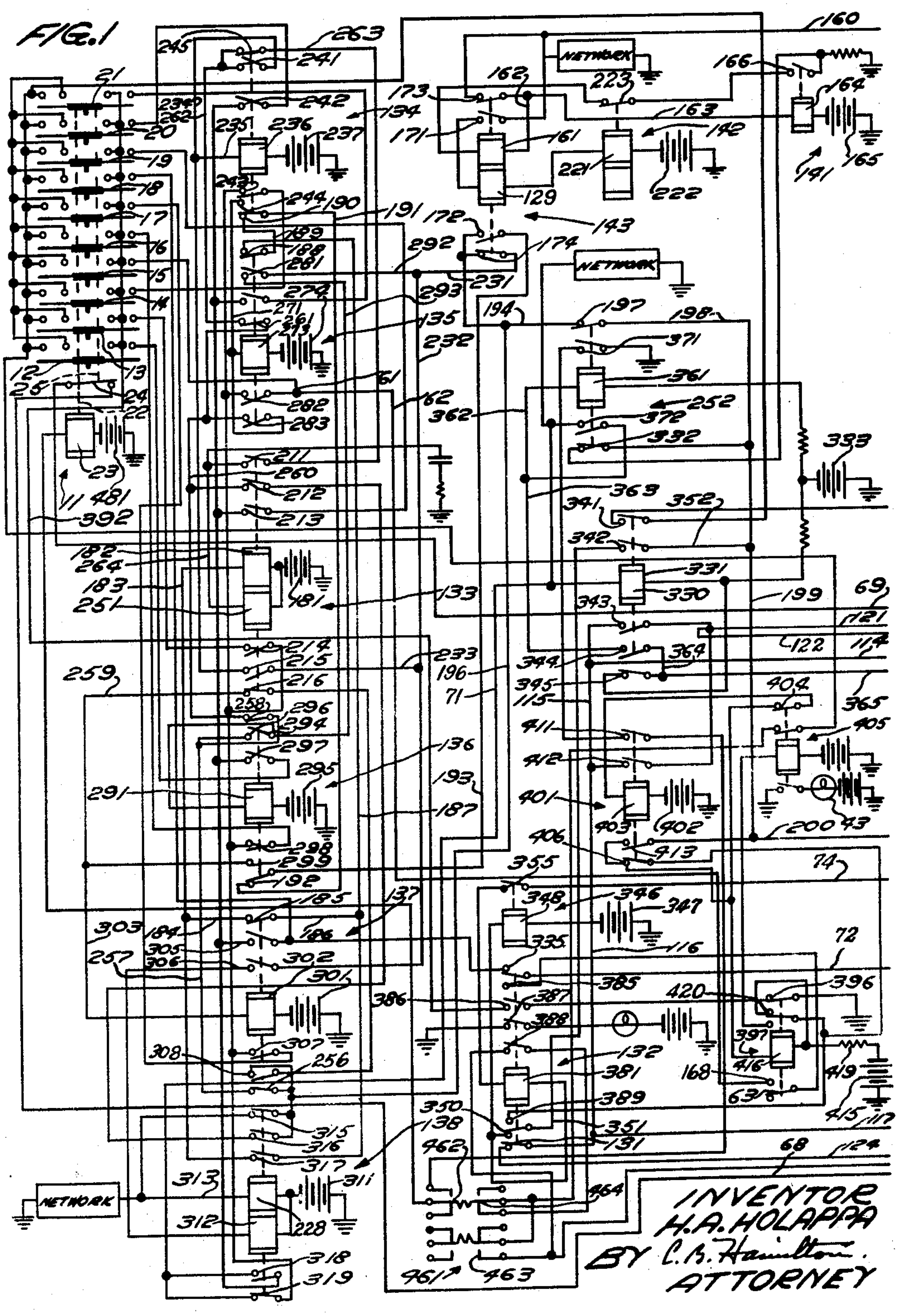
Figure 2:
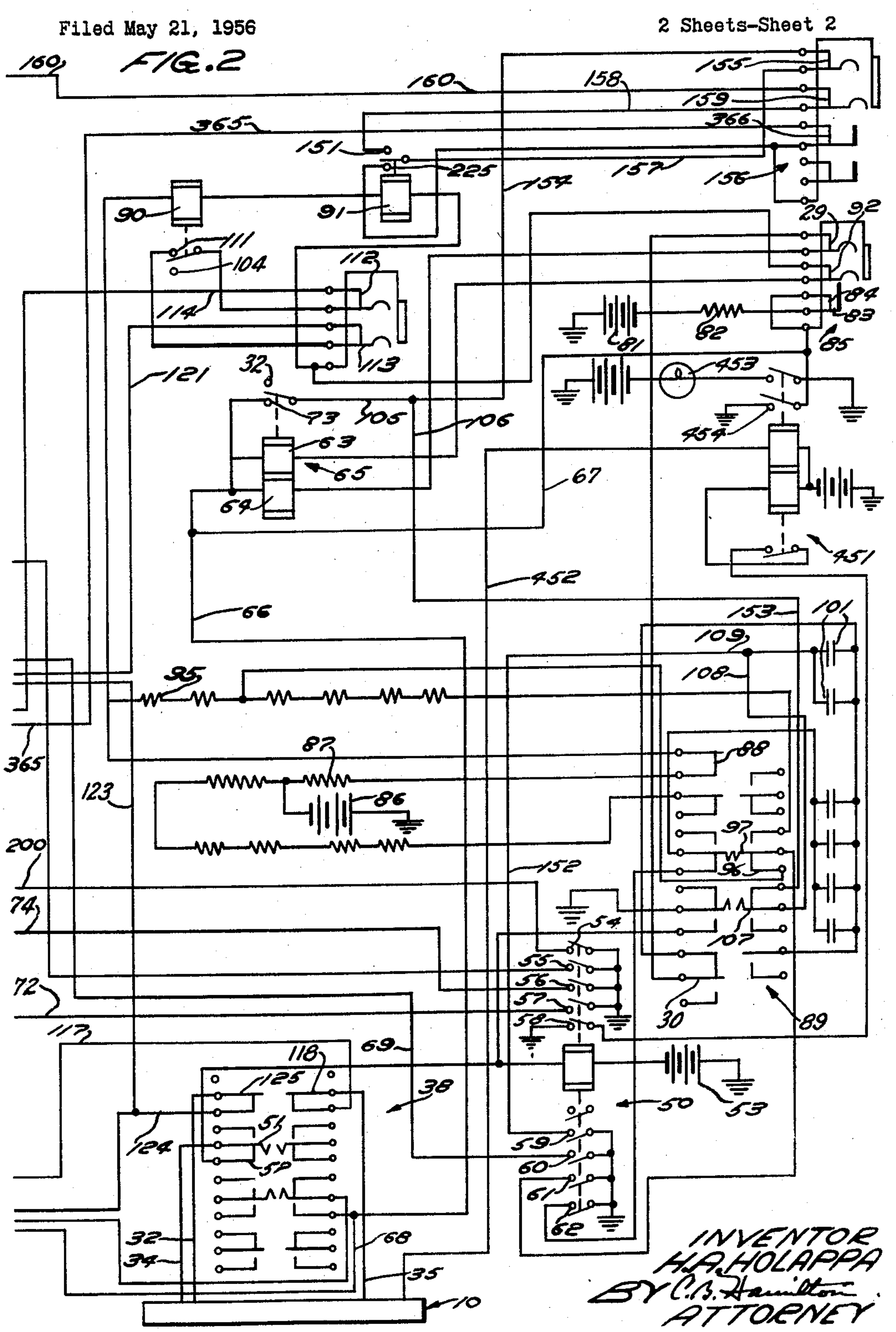

A complete understanding of the invention may be obtained from the following detailed description of an apparatus forming a specific embodiment thereof, when read in conjunction with the appended drawings, in which Figs. 1 and 2, when joined together, are diagrammatic views of an apparatus forming one embodiment of the invention.

Referring now in detail to the drawings, there is shown therein test pulsing apparatus for simulating a telephone dial to pulse automatically, or manually, telephone apparatus, such as, for example, a centralized automatic message accounting tandem dial pulse sender unit 10. The pulsing apparatus includes a key set 11 of a well known type having individual normally open switches or keys 12, 13, 14, 15, 16, 17, 18, 19, 20 and 21, that may be closed manually and reopened by the energization of a relay 23. The key set also includes normally closed off-normal contacts 24, which are opened through a mechanical connection 25, whenever any of the keys is closed and are reclosed whenever the relay 23 is operated to reset one of the switches. A "tip" lead 34 and a "ring" lead 35 are connected to the sender unit 10.

When the test pulsing apparatus is to be used, the unit 10 is actuated to place ground on the lead 34, which energizes a relay 50 through contacts 51 and 52 of the switch 38 and a battery 53. The relay 50 closes contacts 54, 55, 56, 57, 58, 59, 60, 61 and 62. This grounds the battery and ground sides of windings 63 and 64, respectively, of relay 65 through conductors 66, and 68, the contacts 24 of the relay 23, a conductor 69 and the contacts 60 of the relay 50 so that the relay 65 is energized by a battery 81 through a resistor 82 and contacts 83 and 84 of a jack 85. The relay 65 operates by energizing current from a battery 86, a resistor 87, contacts 88 of a key 89, relay windings 90 and 91, contacts 92 through the winding 63 to ground. Relays 65, 90 and 91 are polar relays and when current from battery 86 operates them, relay 90 closes contacts 111, relay 91 closes contacts 225 and relay 65 closes contacts 32. For the purposes of the following discussion these positions will be called the deactuated positions and the positions of closed contacts 104, 151 and 73 for relays 90, 91 and 65 respectively will be called the operated or actuated positions.

Then, when one of the keys 12 through 21 is closed, assuming the key 16 to be closed, it opens the contacts 24, which removes ground from the battery side of the windings 63 and 64 to permit the battery 81 to energize the relays 90, 65 and 91 through the contacts 83 and 84, conductor 67, the primary winding 63, the contacts 92, the windings of relays 91 and 90, resistor 95, contacts 96, 97 and 61 to ground. However, until capacitors 101 in series with the secondary winding 64 of relay 65 are charged through contacts 29 of jack 85 and contacts 30 of key 89, the secondary winding is stronger than the primary winding 63 so that relay 65 is not operated. Then, as the capacitors charge in a predetermined period of time, the current in the winding 64 becomes negligible and the winding 63 operates the relay 65 to close contacts 73, thereby shunting relay winding 63 by providing ground through conductors 105 and 106, contacts 107 and conductors 108 and 109 and contacts 59 of relay 50. The capacitors 101 discharge through this circuit to ground and then the relay 65 drops out. Closing of contacts 73 reenergizes relays 90 and 91. When the relay 65 drops out, its contacts 73 open and it is reenergized after the capacitors 101 charge. Thus, the relay 65 periodically operates and drops out, and the relays 90 and 91 operate and drop out to these actions of the relay 65. The relay 90 has contacts 111 for connecting ring and tip conductors 32 and 35 through contacts 112 and 113, conductors 114, 115, 116, and 117 and contacts 118 to the tip lead 35 and conductors 121, 122, 123 and 124 and contacts 125 to the ring lead 32.

The contacts 111 pulse the tip and ring leads 35 and 32 unless break contacts 131 of a relay 132 are closed to shunt these leads. In order to provide an initial delay for the sender or sending unit 10 to set itself after being seized by the pulsing circuit as the relay 50 is actuated, the relay 132 is left deenergized until a relay 138, the last operated of a series of counting relays 133, 134, 135, 136, 137 and 138 connected to be actuated in the order named by relays 91, 141, 142 and 143. On the first operation of the relay 91, its contacts 151 close to connect the relay 141 to ground through the contacts 59 of the relay 50, conductors 152 and 108, contacts 107, conductors 153 and 154, contacts 155 of a jack 156, conductor 157, the contacts 151, conductor 158, jack contacts 159, conductor 160, contacts 173 of relay 143, conductors 163, winding 164 of the relay 141 and a grounded battery 165. This operates relay 141 to close contacts 166. Then, as the relay 91 drops out, it removes a direct shunt to ground of the winding 161, operating relay 143 which pulls up to close contacts 171 and 172 and open contacts 173 and 174. Closing of contacts 172 energizes the first counting relay 133 through the following circuit: battery 181, winding 182, conductors 183 and 184, contacts 185, conductors 186 and 187, contacts 188, conductor 189, contacts 190, conductor 191, contacts 192, conductor 193, contacts 172, conductor 194, contacts 197, conductors 198, 199 and 200 and the contacts 54 to ground. The relay 133 then pulls up to close contacts 211, 212, 213, 214 and 215 and open contacts 216.

The second operation of the relay 91 completes an energizing circuit of the relay 142 that may be traced from a battery 222 through primary winding 129 of relay 143 the contacts 171 of the relay 143 and the contacts 151 of the relay 91 to ground through contacts 59 of the relay 50. The relay 142 pulls up to open contacts 223, which drops out the relay 141. Then, as the relay 91 is droped out, the second time by the second energization of the relay 65, it opens contacts 151 and closes contacts 225. Opening of the contacts 151 breaks the circuits to ground from the relay 142 and 143 to drop them out. The relay 143 opens the contacts 172 to remove the operating circuit of relay 133. However, relay 133 is held locked through its primary winding 251, conductor 264, its own contacts 211, contact 245 of relay 134, conductor 262, contact 261 of relay 135, conductor 260, contact 258 of relay 136, conductor 257, contact 256 of relay 137, conductor 196, contact 197 of relay 252, conductors 198, 199 and 200, to ground on contact 54 of relay 50. The relay 143 also closes contacts 174 to energize the second counting relay 134 through the following circuit: ground from contacts 54 to the conductors 200, 199, 198, contacts 197 of relay 252, conductor 194, the contacts 174, conductors 231, 232 and 233, the contacts 215 of the relay 133 which is held locked under control of relay 134, conductors 234 and 235, winding 236 of the relay 134 and grounded battery 237. The relay 134 pulls up to close contacts 241, 242, 243 and 244 and open contacts 190 and 245. Opening of the contacts 245 breaks the holding circuit to winding 251 of the first counting relay 133 and the closing of contacts 241 connects a holding circuit for the relay 134 from ground through contacts 54 of relay 50, conductors 200, 199 and 198, contacts 197 of relay 252, conductor 196, contacts 256, conductor 257, contacts 258, conductor 260, contacts 261, conductor 262, contacts 241, conductors 234 and 235, winding 236 of the relay 134 and to ground through battery 237.

On the second deenergization of the pulsing relay 65, the relay 91 is operated the third time, and actuates the relay 141. Then, on the third operation of the pulsing relay 65, the relay 143 is actuated to open the contacts 174 and close contacts 172 to actuate the third counting relay 135 through the following circuit: ground from the contacts 54, conductors 200, 199, 198, contact 197 to the contacts 172, conductor 193, the contacts 192 of the relay 136, conductor 191, the contacts 244 of the second counting relay 134, conductor 271, winding 273 of the relay 135 and battery 274. The third counting relay 135 then pulls up to close contacts 281, 282 and 283 and open contacts 188 and 261. Opening of contacts 261 breaks a holding circuit of the second counting relay 134 to drop it out.

Then, on the fourth deenergization of the pulsing relay 65 to energize the counter-actuating relay 91, the relay 142 is actuated, which drops out relay 141. Then, on the fourth energization of relay 65 to deenergize the relay 91, the relay 142 is dropped out to deenergize relay 143. The deenergization of relay 143 closes contacts 174 to supply ground from the contacts 174 to the ground side of winding 291 of fourth counting relay 136 through conductors 231 and 292, contacts 281 of the third counting relay 135 and conductors 293 and 294, which completes the circuit from grounded battery 295 to energize the fourth counting relay 136 to close contacts 296, 297, 298 and 299 and open contacts 192 and 258. Opening of contacts 258 drops out the third counting relay 135.

On the fifth deenergization of pulsing relay 65 and the consequent fifth energization of relay 91, the relay 141 is operated, and as the relay 65 is energized and the relay 91 deenergized the fifth time, the relay 143 is energized. The relay 143 makes the contacts 172 to energize the fifth counting relay 137 from a battery 301 through winding 302, conductor 303, contacts 299 of the fourth counting relay 136, conductor 193 and the contacts 172 connected to ground through contacts 54 and 197 of relay 50 and 252, respectively. The relay 137 closes contacts 305, 306, 307 and 308 and opens contacts 185 and 256. Opening of contacts 256 breaks the holding circuit of the fourth counting relay 136 to deenergize it.

On the sixth deenergization of the pulsing relay 65 and sixth energization of the relay 91, the relay 142 is energized and drops out the relay 141, and then on the sixth deenergization of the relay 91, relays 142 and 143 are dropped out. The relay 143 closes its contacts 174 to operate the sixth counting relay 138 from a battery 311 through winding 312, contacts 306 of the fifth counting relay 137, conductors 232, 231 and the contacts 174 to ground. The relay 138 closes contacts 315, 316, 317 and 318 and opens contacts 319. At this time, winding 330 of resetting relay 331 is shunted by contacts 345 thereof and contacts 225 of relay 91.

On the seventh deenergization of relay 65 and seventh operation of relay 91, shunt is removed from winding 330 of relay 331, which is operated by a battery 333 through winding 330, conductor 71, contacts 318 of relay 138, contacts 305 of still operated relay 137, contacts 335 of relay 132, conductor 72 and contacts 57 to ground of relay 50. The relay 331 closes contacts 341, 342, 343 and 344, and opens contacts 345. This operates relay 346 from battery 347 through winding 348 thereof, contacts 350 of relay 132, conductor 351, contacts 342 of relay 331, conductors 352, 199 and 200 and the contacts 54 of the relay 50. The relay 346 closes its contacts 355 to shunt down relay 132 to prevent its operation at this time. Then as relay 91 is released the seventh time to close contacts 225, the relay 252 is energized from the battery 333, winding 361 of the resetting relay 252, conductors 362 and 363, contacts 344 of the relay 331, conductors 364 and 365, contacts 366 of the jack 156, and the contacts 225, 155, 107 and 59 to ground. The seventh release of relay 91 also operates relay 134. The relay 252 closes contacts 371 and 372 and opens contacts 197 and 332. Opening of contacts 197 drops out relays 137 and 138 to reset them. The deactuation of relay 138 opens contacts 318, thereby preventing a connection to ground through this path. However, upon the closure of relay 252, a circuit is provided from battery 333, winding 330, contacts 372 of relay 252, conductor 363, contacts 344 of relay 331, conductors 364, 365, contacts 366 of jack 156 to ground provided through contacts 225 of relay 90.

The above-described initial operation of the counting relays 133, 134, 135, 136, 137 and 138 gives the sender 10 time after its seizure to prepare itself for dial pulses. Then, assuming the number four key switch 16 to have been closed manually, the next or first operation of the relay 91, the relay 142 is operated to deactuate relay 141 and the contacts 225 of the relay 91 open to drop out the relays 252 and 331. The contacts 342 of the relay 331 open to remove the shunt of winding 381 of relay 132, which is energized through a circuit including grounded contacts 56 of the relay 50, conductor 74, contacts 355 of the relay 346, the winding 381, the winding 348 of relay 346 and the battery 347. The relay 132, which controls transmission of the pulses from the pulsing relay 90 to the tip and ring leads of the sender 10, then closes contacts 385, 386, 387, 388 and 389 and opens contacts 131, 335 and 350. Opening of the contacts 131 removes the shunt of the tip and ring leads 32 and 35 so that pulses thereto from the action of the contacts 111 or relay 90, whose action simulates dial tip and ring contacts, go to the tip and ring leads and therefore the first pulse is sent over the leads. On the next or first release of the relays 90 and 91, the relays 143 and 142 are deactuated closing contacts 174, thereby operating relay 134 and deactuating relay 133 as before. On the next or second operation of the relays 90 and 91, the relay 141, and the tip and ring leads are reclosed to actuate a line relay. On the next or second release of the relays 90 and 91, the relay 91 causes the relay 143 to operate closing contacts 172, thereby operating the third counting relay 135 and drop out counting relay 134 as described before. On the third operation of the relays 90 and 91, the relay contacts 111 operate to send a third pulse to the ring and tip leads and the relay 91 operates the relay 142 to deactuate relay 141. Then on the third release of the relay 91, the relay 143 and 142 are deactuated, to close contacts 174 operated to operate the fourth counting relay 136, which releases the third counting relay 135. The relay 331 is held shunted by its contacts 345 and contacts 225 of the relay 91.

The four-pulse digit switch or key 16 having been closed, on the fourth operation of the relays 90 and 91, the contacts 225 of the relay 91 open to remove the shunt from the relay 331 and the relay 331 is operated from the battery 333 through the winding 330, contacts 319 of the relay 138, contacts 298 of relay 136, contacts of the switch 16, conductors 392, contacts 386 of the relay 132, contacts 396 of relay 397 to ground. Then relay 401 is operated from battery 402 through winding 403 thereof, contacts 404 of relay 405, contacts 406 of relay 401, contacts 389 of relay 132, contacts 342 of relay 331 and contacts 54 of relay 50 to ground. The relay 401 then closes contacts 411, 412 and 413 and breaks contacts 406. This connects relay 397 to ground from battery 415, winding 416 of relay 397, contacts 413 of relay 401 and contacts 54 of relay 50. However, relay 397 does not operate as it is shunted by resistance 419 and contacts 420 of relay 397. Then, on the fourth release of the relays 90 and 91 the relay 143 is operated and, the relay 252 is operated to release the fourth counting relay 136, and, the tip and ring leads are kept closed through contacts 343 of the relay 331 and the contacts 118 and 125 of the key switch 38. The unit 10 has thus been pulsed four times.

Upon the unit 10 being pulsed the fourth time, an interdigital interval or delay of three pulses is provided. On the next first interval operation of the relays 90 and 91, the relay 142 is operated, which drops out the relays 141, 252 and 331 and relay 133 operates upon closure of contacts 197 of relay 252. When the relay 331 drops out, the shunt of relay 397 is broken by contacts 342 of the relay 331 opening, and the relay 397 is operated from the battery 415 through winding 416, contacts 413 of relay 401 and contacts 54 of relay 50 to remove ground from key 12 through contacts 396. On the first release of the relays 90 and 91, the relays 143 and 142 are deactuated closing contacts 174 thereby operating relay 134 and deactuating relay 133, and, on the second operation of the relays 90 and 91, the relay 141 is operated on the second release of the relays 90 and 91, the relay 143 is operated to operate the third counting relay 135, which releases the second counting relay 134, and the relay 331 is connected to ground by contacts 282 of the relay 135, but the relay 331 is not operated at this time because its winding is shunted by its contacts 345 and contacts 225 of the relay 91. Then on the third operation of relays 90 and 91, relay 142 is operated to drop out relay 141 and the shunt around the relay 331 is removed and it operates to operate relay 405 to light an indicating lamp 43 and release relay 401. Then, on the third release of the relays 90 and 91, the relays 142 and 143 are released to operate relay 252 which breaks relay 135.

Then the cycle starts over to produce four pulses to the sender 10 followed by three pulses of delay, the interdigital pulses, and the circuit continuously cycles in this manner until the sender 10 connects relay 451 to ground through lead 452. This occurs if the sender 10 is properly wound to receive the pulses, and, if so, indicating lamp 453 is lit. When the relay 451 is operated it closes contacts 454 to shunt pulse-generating relay 65 to ground to prevent further operation thereof. If the sender 10 is improperly wired, the pulsing continues indefinitely to apprise an operator of that fact.

To operate the above-described circuit manually for each digit to be sent to the sender 10, a key unit 461 is actuated manually to close contacts 462 and open contacts 464. Then, the first digit switch of the key switch 11 is depressed, and the circuit operates as described above, assuming the number four or four-pulse switch 16 to have been closed manually, to produce a six pulse initial or predigital delay period, then send four pulses to the tip and ring leads 32 and 35. After the four pulses to the tip and ring have been completed then on the following operation of relays 91, the shunt around relay 331 is removed permitting it to operate, which in turn operates relay 401. Then when relay 91 is released, relay 252 will operate.

The operation of relay 252 closes a circuit to operate switch relay 23, from battery 481, relay winding 23, contact 462 of key unit 461, contact 411 of relay 401, contact 371 of relay 252 to ground. The relay 23 releases the switch 16 and closes the off normal contacts 24. With the off normal contacts 24 closed, ground is supplied to the battery side of relay 65 and pulsing stops. This ground is supplied by contact 60 of relay 50 through off normal contact 24 to winding of relay 65. This completes the pulse generating and control features for the first digit. The one of the switches 12 through 21 desired for the next digit is then closed manually, and the apparatus delivers the proper number of pulses to the sender followed by the interdigital delay of three pulses. The start of each digit after the first digit is caused by the manual actuation of the switch of the set 11 opening the contacts 24 to remove the shunt of the relay 65. Thus, any combination of digits may be sent manually to the sender 10 merely by pressing the selected ones of the keys or switches 12–21 for each digit. Or, if the key unit 461 is in its normal or unoperated condition, once one of the keys 12 through 21 is closed manually, the apparatus first applies a six-pulse predigital delay and then periodically sends groups of pulses, depending, of course, on which key is closed, to the sender 10 with a three-pulse delay between each group of pulses. This continues until the sender 10 actuates the relay 451 to stop the periodic operation of the pulse-generating relay 65.

Whenever any of the digital switches or keys 12 through 21, other than the previously described four-pulse switch 16 is closed, the apparatus works identically with the manner thereof described above for the switch 16 except that, for digits up through six pulses, the corresponding number of the counting relays 133 through 138 are operated one after another in the sender pulsing period rather than only the first four counting relays 133, 134, 135 and 136 as described for the four-pulse switch 16. Whenever one of the switches 17, 18, 19 and 12, which are the seven-pulse eight-pulse, nine-pulse and ten-pulse digital switches, respectively, in the digital or sender-pulsing period, all six relays 133 through 138 are pulsed, the relay 138 is held operated, and then the relays 133, 134, 135 and 136 again are operated sequentially before the interdigital pulsing is started. Thus, the sixth counting relay 138 and the fourth counting relay 136 are energized at the end of the ten pulses when the ten-pulse digital switch 12 is closed, the sixth and third counting relays 138 and 135 when the ninth-pulse digital switch 21 has been closed, the sixth and second relays 138 and 134 when the eight-pulse switch 20 has been closed, and the relays 138 and 133 in an operation in which the seven-pulse switch 19 has been closed. Otherwise, the operation is the same as described hereinabove for the four-pulse switch 16.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for testing a telephone sending unit, a pulse source for producing pulses at a predetermined frequency, a counting circuit including a group of relays, key switch means having selectively actuatable contacts for setting the counting circuit, means operable by the key switch for starting the pulse source, relay means operable by the counting circuit for connecting the pulse source to a telephone sending unit after the creation of a predetermined number of pulses forming a predigital delay period, and means operable by the counting circuit after the predigital delay period for alternately connecting the pulse source to the unit for digital pulsing of the unit and disconnecting the pulse source from the unit for interdigital delay periods.

2. In an apparatus for testing a telephone sending unit, a pulse source for producing pulses at a predetermined frequency, a counting circuit including a group of relays for receiving pulses from the pulse source, a key switch means having selectively actuatable contacts for setting the counting circuit, means operated by the key switch means for starting the pulse source, relay means actuated by the counting circuit after the creation of a predetermined number of pulses forming a predigital delay period for connecting the pulse source to the telephone sending unit, means operated by the counting circuit after the predigital delay period for alternately connecting the pulse source to the sending unit for digital pulsing of the unit and disconnecting the pulse source from the sending unit for interdigital delay periods, and relay means operated by the sending unit after the unit has received a predetermined number of digital pulses for stopping the pulse source.

3. In an apparatus for testing a telephone sending unit, a pulse source for producing pulses at a predetermined frequency, a relay counting circuit connected to the pulse source for sensing the number of pulses produced thereby, first means operated by the counting circuit after a first predetermined number of pulses have been received from the pulse source forming a predigital delay period for connecting the pulse source to the telephone sending unit, a second means operated by the counting circuit after the predigital delay period for alternately disconnecting the pulse source from the sending unit after a second predetermined number of pulses are sensed by the counting circuit forming a digital pulsing period and reconnecting the pulse source to the sending unit after a third predetermined number of pulses are sensed by the counting circuit forming an interdigital delay period, and key switch means for operating the pulse source and setting the counting circuit to determine the digital pulsing period.

4. In an apparatus for testing a telephone sending unit, a pulse source for producing pulses at a predetermined frequency, a counting circuit connected to the pulse source for sensing the number of pulses produced thereby, a first relay operated by the counting circuit after a first predetermined number of pulses have been sensed thereby forming a predigital delay period for connecting the pulse source to the telephone sending unit, a second relay operated by the counting circuit after the predigital delay period for alternately disconnecting the pulse source from the sending unit after a second predetermined number of pulses are sent to the sending unit forming a digital pulsing period and reconnecting the pulse source to the sending unit after a third predetermined number of pulses are sensed by the counter circuit forming an interdigital delay period, key switch means for starting the pulsing circuit and setting the counting circuit to determine the digital pulsing period, and a third relay means operated by the sending unit after reception of a number of digital pulsing periods for stopping the pulse source.

References Cited in the file of this patent

UNITED STATES PATENTS

| | | |
|---|---|---|
| 1,154,250 | Kaisling | Sept. 21, 1915 |
| 1,862,601 | Madadie | June 14, 1932 |
| 2,004,607 | Hersey | June 11, 1935 |
| 2,386,609 | Hubbard | Oct. 9, 1945 |
| 2,434,959 | Richard | Jan. 27, 1948 |
| 2,680,161 | Clement | June 1, 1954 |